US008727062B2

(12) United States Patent
Ibe et al.

(10) Patent No.: US 8,727,062 B2
(45) Date of Patent: May 20, 2014

(54) WORK VEHICLE COMPRISING VEHICLE FRAMES

(75) Inventors: Toshihiko Ibe, Osaka (JP); Shigemi Hidaka, Osaka (JP)

(73) Assignee: Yanmar Co., Ltd., Osaka (JP)

(*) Notice: Subject to any disclaimer, the term of this patent is extended or adjusted under 35 U.S.C. 154(b) by 330 days.

(21) Appl. No.: 13/147,271

(22) PCT Filed: Jan. 22, 2010

(86) PCT No.: PCT/JP2010/050766
§ 371 (c)(1),
(2), (4) Date: Aug. 1, 2011

(87) PCT Pub. No.: WO2010/087276
PCT Pub. Date: Aug. 5, 2010

(65) Prior Publication Data
US 2011/0284306 A1    Nov. 24, 2011

(30) Foreign Application Priority Data

Feb. 2, 2009 (JP) ................................. 2009-021472

(51) Int. Cl.
*B62D 21/02* (2006.01)

(52) U.S. Cl.
USPC ........................... 180/291; 280/781; 180/312

(58) Field of Classification Search
USPC ......... 180/292, 298, 299, 300, 374, 311, 312; 280/781, 784, 785; 296/203.02
See application file for complete search history.

(56) References Cited

U.S. PATENT DOCUMENTS 1,638,948 A * 8/1927 Masury et al. ................ 280/796
1,652,159 A * 12/1927 Baker ........................... 248/672

(Continued)

FOREIGN PATENT DOCUMENTS

| JP | 09-002321 | 1/1997 |
| JP | 2005-349856 | 12/2005 |

(Continued)

OTHER PUBLICATIONS

English Translation of International Preliminary Report on Patentability for International Appl. No. PCT/JP2010/050766, International Bureau, Switzerland, mailed Aug. 18, 2011, 6 pages.

(Continued)

*Primary Examiner* — Katy M Ebner
*Assistant Examiner* — Brodie Follman
(74) *Attorney, Agent, or Firm* — Sterne, Kessler, Goldstein & Fox P.L.L.C.

(57) ABSTRACT

Outer rear end surfaces of a pair of front frames are connected to corresponding inner front end surfaces of a pair of main frames with spacers being interposed therebetween. Accordingly, a width between the front frames is independent of a width between the main frames, so that maximum steerable angles of front wheels can be increased as much as possible without increasing a mounting pitch of the front wheels. The front frames can be arranged such that at least upper regions of the rear end surfaces thereof are located forward of the mount flange, and the engine unit and the flywheel unit are supported by the vehicle frames such that at least lower portions thereof overlap the vehicle frames in a side view, and the mount flange overlap the upper regions of the rear end surfaces of the front frames in a front view.

3 Claims, 13 Drawing Sheets

(56) References Cited

U.S. PATENT DOCUMENTS

| | | | |
|---|---|---|---|
| 1,729,381 A * | 9/1929 | Golden | 248/612 |
| 1,731,837 A * | 10/1929 | Wood | 180/291 |
| 1,738,532 A * | 12/1929 | Harbour | 248/605 |
| 2,119,193 A * | 5/1938 | Avery | 180/291 |
| 3,580,611 A * | 5/1971 | McNitt | 280/433 |
| 3,825,090 A * | 7/1974 | Runkle et al. | 180/292 |
| 4,320,814 A * | 3/1982 | Middelhoven | 180/294 |
| 5,005,864 A * | 4/1991 | Chachere | 280/800 |
| 5,156,230 A * | 10/1992 | Washburn | 180/170 |
| 5,248,237 A * | 9/1993 | Nakamura | 414/686 |
| 5,725,247 A * | 3/1998 | Nilsson et al. | 280/781 |
| 6,183,013 B1 * | 2/2001 | Mackenzie et al. | 280/797 |
| 6,199,894 B1 * | 3/2001 | Anderson | 280/638 |
| 6,286,868 B1 * | 9/2001 | von Mayenburg | 280/800 |
| 6,299,210 B1 * | 10/2001 | Ruehl et al. | 280/800 |
| 6,494,285 B1 * | 12/2002 | Williams | 180/291 |
| 6,733,040 B1 * | 5/2004 | Simboli | 280/800 |
| 6,871,875 B2 * | 3/2005 | Grimm et al. | 280/785 |
| 6,874,816 B2 * | 4/2005 | Herrmann et al. | 280/781 |
| 7,036,622 B2 * | 5/2006 | Iwaki | 180/311 |
| 7,273,341 B2 * | 9/2007 | Yoshii et al. | 414/686 |
| 7,389,844 B2 * | 6/2008 | Van Der Bijl | 180/291 |
| 7,441,809 B1 * | 10/2008 | Coombs et al. | 280/785 |
| 7,735,594 B2 * | 6/2010 | Hidaka | 180/312 |
| 7,887,093 B2 * | 2/2011 | Pitsenbarger et al. | 280/781 |
| 7,980,594 B2 * | 7/2011 | Hendriks et al. | 280/781 |
| 8,069,944 B2 * | 12/2011 | Fell | 180/299 |
| 8,157,042 B2 * | 4/2012 | Fujiki | 180/89.12 |
| 8,312,955 B2 * | 11/2012 | Kawashiri | 180/312 |
| 8,347,994 B2 * | 1/2013 | Bering et al. | 180/68.3 |
| 8,469,136 B2 * | 6/2013 | Manabe et al. | 180/291 |
| 2003/0070848 A1 * | 4/2003 | Hasegawa et al. | 180/53.1 |
| 2003/0136602 A1 * | 7/2003 | Tsuda | 180/312 |
| 2003/0227165 A1 * | 12/2003 | Herrmann et al. | 280/781 |
| 2004/0148778 A1 * | 8/2004 | Fleming | 29/897.2 |
| 2005/0110263 A1 * | 5/2005 | Rini et al. | 280/781 |
| 2005/0116445 A1 * | 6/2005 | Hatfull | 280/651 |
| 2006/0055162 A1 * | 3/2006 | Beckmann et al. | 280/781 |
| 2006/0108784 A1 * | 5/2006 | Van Der Bijl | 280/800 |
| 2006/0219462 A1 * | 10/2006 | Martin et al. | 180/292 |
| 2006/0266571 A1 * | 11/2006 | Mattson | 180/209 |
| 2007/0176406 A1 * | 8/2007 | Ruehl | 280/785 |
| 2007/0193816 A1 * | 8/2007 | Hidaka | 180/374 |
| 2008/0150203 A1 * | 6/2008 | Mir et al. | 267/140.11 |
| 2008/0265602 A1 * | 10/2008 | Branning et al. | 296/26.08 |
| 2008/0289168 A1 * | 11/2008 | Melone et al. | 29/428 |
| 2009/0039633 A1 * | 2/2009 | Wrinkle et al. | 280/781 |
| 2009/0308680 A1 * | 12/2009 | Fell | 180/299 |
| 2010/0066128 A1 * | 3/2010 | Hendriks | 296/204 |
| 2010/0270785 A1 * | 10/2010 | Honzek | 280/785 |
| 2011/0073402 A1 * | 3/2011 | Manabe et al. | 180/291 |
| 2011/0163527 A1 * | 7/2011 | Hunt | 280/785 |
| 2011/0272966 A1 * | 11/2011 | Kawashiri | 296/190.08 |
| 2011/0284306 A1 * | 11/2011 | Ibe et al. | 180/291 |
| 2012/0112492 A1 * | 5/2012 | Grumbo | 296/190.05 |
| 2012/0193109 A1 * | 8/2012 | Moore et al. | 169/24 |
| 2012/0319390 A1 * | 12/2012 | Burger et al. | 280/785 |

FOREIGN PATENT DOCUMENTS

| | | |
|---|---|---|
| JP | 2006-103430 | 4/2006 |
| JP | 2006-103433 | 4/2006 |
| JP | 2008-105537 | 5/2008 |

OTHER PUBLICATIONS

International Search Report for PCT/JP2010/050766, Japanese Patent Office, mailed Apr. 20, 2010, 4 pages.

* cited by examiner

WORK VEHICLE COMPRISING VEHICLE FRAMES

FIELD OF THE INVENTION

The present invention relates to a work vehicle including a pair of right and left vehicle frames that extend in a vehicle longitudinal direction, a front axle unit and an engine unit that are supported by the pair of vehicle frames, a flywheel unit that is connected to a rear end of the engine unit, a pair of right and left front wheels that are supported by the front axle unit in a steerable manner, and a transmission that is disposed backward at a distance from the flywheel unit and operatively receives rotational power from the engine unit through the flywheel unit.

BACKGROUND ART

There has been proposed a work vehicle (refer to, for example, Patent Document 1, which will be described later) including a pair of right and left vehicle frames, a front axle unit, a pair of right and left front wheels, an engine unit, a flywheel unit, and a transmission, wherein the pair of vehicle frames extend in a vehicle longitudinal direction such that plate surfaces thereof are substantially aligned in the vertical direction and face each other, the front axle unit is located below the pair of vehicle frames and is supported by the pair of vehicle frames so as to be provided in the vehicle width direction as well as to have two ends that extend outward in the vehicle width direction from the pair of vehicle frames, the pair of front wheels are supported in a steerable manner by the two ends of the front axle unit, respectively, the engine unit is supported by the pair of vehicle frames, the flywheel unit is connected to a rear end surface of the engine unit, and the transmission is disposed behind and apart from the flywheel unit and operatively receives rotational power from the engine unit by way of the flywheel unit. The pair of vehicle frames include a pair of right and left front frames and a pair of right and left main frames, respectively. The pair of front frames support the front axle unit. The pair of main frames have front ends whose inner surfaces are directly connected to outer surfaces of rear ends of the pair of front frames, and rear ends that are directly connected to side surfaces of a transmission case of the transmission, respectively.

The work vehicle disclosed in Patent Document 1 is useful in view of the feature that the balance of weight can be preferably kept in the longitudinal direction because the front axle unit and the engine unit are disposed in the front section of the vehicle and the transmission is disposed behind and apart from the engine unit in the vehicle longitudinal direction. However, this work vehicle still has possibility for improvement on the following points.

More specifically, it needs to reduce as much as possible a spacing width (a distance in the vehicle width direction) between the pair of front frames, which support the front axle unit having the two ends to which the pair of front wheels are connected, in order to increase the maximum steerable angles of the pair of front wheels without increasing a mounting pitch by which the pair of front wheels are separated from each other in the vehicle width direction (a distance between the pair of front wheels in the vehicle width direction).

However, in the work vehicle disclosed in Patent Document 1, the outer surfaces of the rear ends of the pair of front frames, which support the front axle unit, are connected directly to the inner surfaces of the front ends of the pair of main frames, respectively. Further, the rear ends of the pair of main frames are connected directly to the respective side surfaces of the transmission case of the transmission.

In other words, in the work vehicle disclosed in Patent Document 1, the spacing width between the pair of main frames is defined by the width (the length in the vehicle width direction) of the transmission case. Further, the spacing width between the pair of front frames is defined dependently on the spacing width between the pair of main frames.

Accordingly, it has not been possible to reduce the spacing width between the pair of front frames freely and independently of the spacing width between the pair of main frames. This leads to the problem that the maximum steerable angles of the pair of front wheels cannot be increased.

Moreover, in the work vehicle disclosed in Patent Document 1, the reduction of the spacing width between the pair of front frames is inhibited also for the following reason.

More specifically, the transmission is preferably disposed as low as possible so as to lower the location of a driver's seat disposed above the transmission as well as to lower the center of gravity of the work vehicle.

Further, the engine unit and the flywheel unit are preferably disposed at low positions so as to level as much as possible the vertical positions between the output shaft of the flywheel unit and the input shaft of the transmission.

In order to meet these demands, in the work vehicle disclosed in Patent Document 1, the pair of front frames are spaced apart from each other in the vehicle width direction by a distance allowing at least a lower portion of the flywheel unit, which has a width larger than that of the engine unit, to be interposed between the pair of front frames.

This inhibits the reduction of the spacing width between the pair of front frames, and it is therefore impossible to increase the maximum steerable angles of the front wheels.

Moreover, in the work vehicle in which the engine unit is supported by the pair of vehicle frames with antivibration support mechanisms being interposed therebetween, there needs to be provided a safety mechanism that limits the amount of relative forward shift of the engine unit with respect to the vehicle frames.

PRIOR ART DOCUMENT

Patent Document

Patent document 1: Japanese Unexamined Patent Publication No. 2006-103430

DISCLOSURE OF THE INVENTION

The present invention has been achieved in view of the conventional art described above, and a first object thereof is to provide a work vehicle that includes a pair of right and left vehicle frames, a front axle unit, an engine unit, a flywheel unit, a pair of right and left front wheels, and a transmission, wherein the pair of vehicle frames extend in the vehicle longitudinal direction in a state of facing each other, the front axle unit and the engine unit are supported by the pair of vehicle frames, the flywheel unit is connected to a rear end surface of the engine unit, the pair of front wheels are supported by the front axle unit in a steerable manner, the transmission operatively receives rotational power from the engine unit by way of the flywheel unit, the pair of vehicle frames include a pair of right and left front frames and a pair of right and left main frames, respectively, the pair of front frames support the front axle unit, the pair of main frames have rear ends that are connected directly or indirectly to respective side surfaces of a transmission case of the transmission, the work vehicle being capable of increasing the maximum steerable angles of the front wheels as much as possible without increasing the mounting pitch of the pair of front wheels with respect to the vehicle width direction.

A second object of the present invention is to provide a work vehicle allowing the engine unit and the flywheel unit to be located as low as possible while achieving the first object.

Further, it is a third object of the present invention to provide a work vehicle capable of realizing a safety mechanism with a simple structure for limiting the amount of relative forward shift of the engine unit with respect to the vehicle frames while achieving the first object, in a case where the engine unit is supported by the vehicle frames in a vibration-isolated manner.

In order to achieve the object, the present invention provides a work vehicle including a pair of right and left vehicle frames that extend in a vehicle longitudinal direction so that plate surface thereof face each other in a state of being substantially aligned in the vertical direction, a front axle unit that is supported by the pair of vehicle frames so as to be located below the pair of vehicle frames and be along a vehicle width direction in a state where two ends thereof are positioned outward of the pair of vehicle frames in the vehicle width direction, a pair of right and left front wheels that are supported by both ends of the front axle unit in a steerable manner, an engine unit that is supported by the pair of vehicle frames, a flywheel unit that is connected to a rear end surface of the engine unit, and a transmission that is disposed backward at a distance from the flywheel unit and operatively receives rotational power from the engine unit through the flywheel unit, wherein the pair of vehicle frames include a pair of right and left front frames that support the front axle unit, and a pair of right and left main frames that have rear ends directly or indirectly connected to side surfaces of a transmission case of the transmission, respectively, and wherein an outer surface of a rear end of each of the pair of front frames is connected to an inner surface of a front end of the corresponding one of the main frames with a spacer being interposed therebetween.

The work vehicle according to the present invention makes it possible to reduce a spacing width between the pair of front frames in the vehicle width direction independently of a spacing width between the pair of main frames that depends on a width (a length in the vehicle width direction) of the transmission case, by changing the thickness of the spacers.

Accordingly, it is possible to increase a maximum steerable angles of the pair of front wheels as much as possible without causing the increase of a mounting pitch by which the front wheels are separated from each other in the vehicle width direction.

In a case where the engine unit includes an engine main body, an output shaft that extends backward from the engine main body and a mount flange that extends radially outward from a rear end of the engine main body, and the flywheel unit includes a flywheel main body that is connected with the output shaft and a flywheel cover that is connected to the mount flange so as to surround the flywheel main body, the pair of front frames are preferably arranged such that at least upper regions in rear end surfaces thereof are located forward of the mount flange, and the engine unit and the flywheel unit are supported by the pair of vehicle frames such that at least lower portions thereof are overlapped with the pair of vehicle frames in a side view and the mount flange is overlapped with the upper regions in the rear end surfaces of the front frames in a front view.

The configuration makes it possible to lower the mounted positions of the engine unit and the flywheel unit that is connected to the mount flange.

In a case where the engine unit is supported by the vehicle frames with the antivibration support mechanisms being interposed therebetween, a distance in the vehicle longitudinal direction between each of the upper regions and the mount flange may be preferably defined such that the mount flange is brought into contact with the upper regions in the rear end surfaces of the pair of front frames when the engine unit is shifted forward by a predetermined distance relatively to the vehicle frames.

The configuration makes it possible to realize a safety mechanism with a simple structure for limiting the amount of relative forward shift of the engine unit with respect to the vehicle frames.

In a more preferable configuration, the rear end surface of each of the pair of front frames is provided with a backward extending region that extends backward from a lower end of the upper region, and the mount flange is overlapped with the backward extending region in a planar view seen from above.

BRIEF DESCRIPTION OF THE DRAWINGS

FIG. 1 is a perspective view of a tractor, which is configured as one embodiment of a work vehicle according to the present invention.
FIG. 2 is a perspective view, seen from front, of a body of the work vehicle.
FIG. 3 is a side view of the body of the work vehicle.
FIG. 4 is a perspective view, seen from above and behind, of an engine unit and the vicinity thereof in the work vehicle.
FIG. 5 is a perspective view, seen from below and front, of a front axle unit in the work vehicle.
FIG. 6 is a perspective view, seed from below and behind, of the front axle unit.
FIG. 7 is a horizontally cross sectional plan view of the engine unit and the vicinity thereof.
FIG. 8 is a perspective view of a front antivibration support mechanism and the vicinity thereof in the work vehicle.
FIG. 9 is a partially exploded perspective view of a transmission and the vicinity thereof in the work vehicle.
FIG. 10 is a partial side view of the work vehicle.
FIG. 11 is a perspective view, seen from behind, of connection sites between front frames and main frames and the vicinity thereof, with the left main frame being removed.
FIG. 12 is a perspective view, seen from a side, of the connection sites between the front frames and the main frames and the vicinity thereof, with a left spacer and the left main frame being removed.
FIG. 13 is a cross sectional view taken along line XIII-XIII indicated in FIG. 3.

EMBODIMENT FOR CARRYING OUT THE INVENTION

Described below is a work vehicle according to a preferred embodiment of the present invention with reference to the accompanying drawings.

Figure 1:
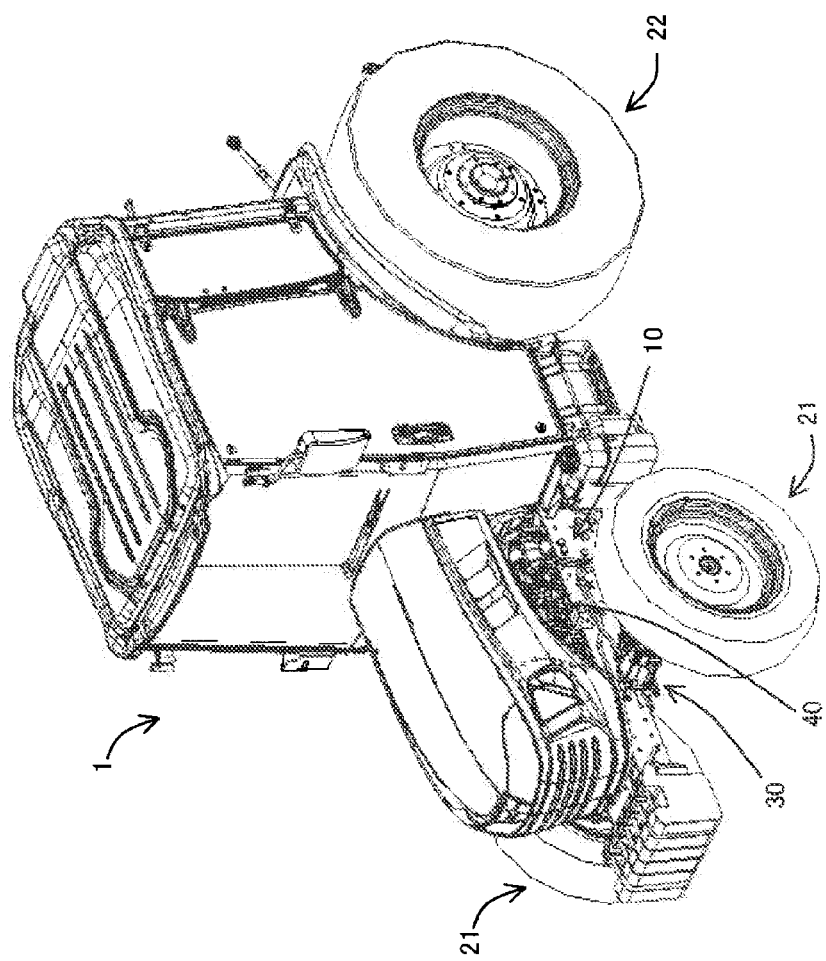
[FIG. 1]

FIG. 1 is a perspective view of a tractor, which is configured as a work vehicle 1 according to the present embodiment.

Figure 2:
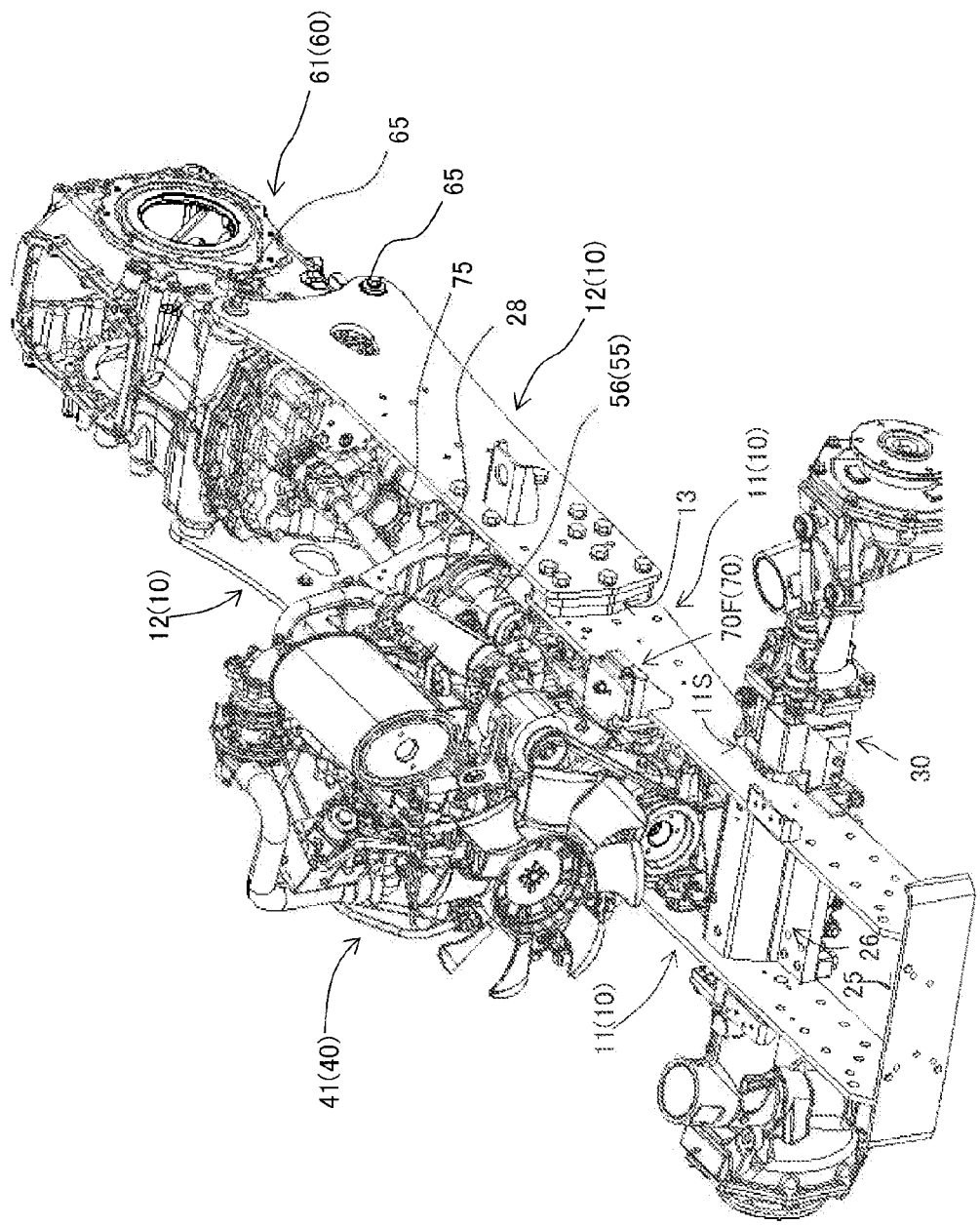
[FIG. 2]
Figure 3:
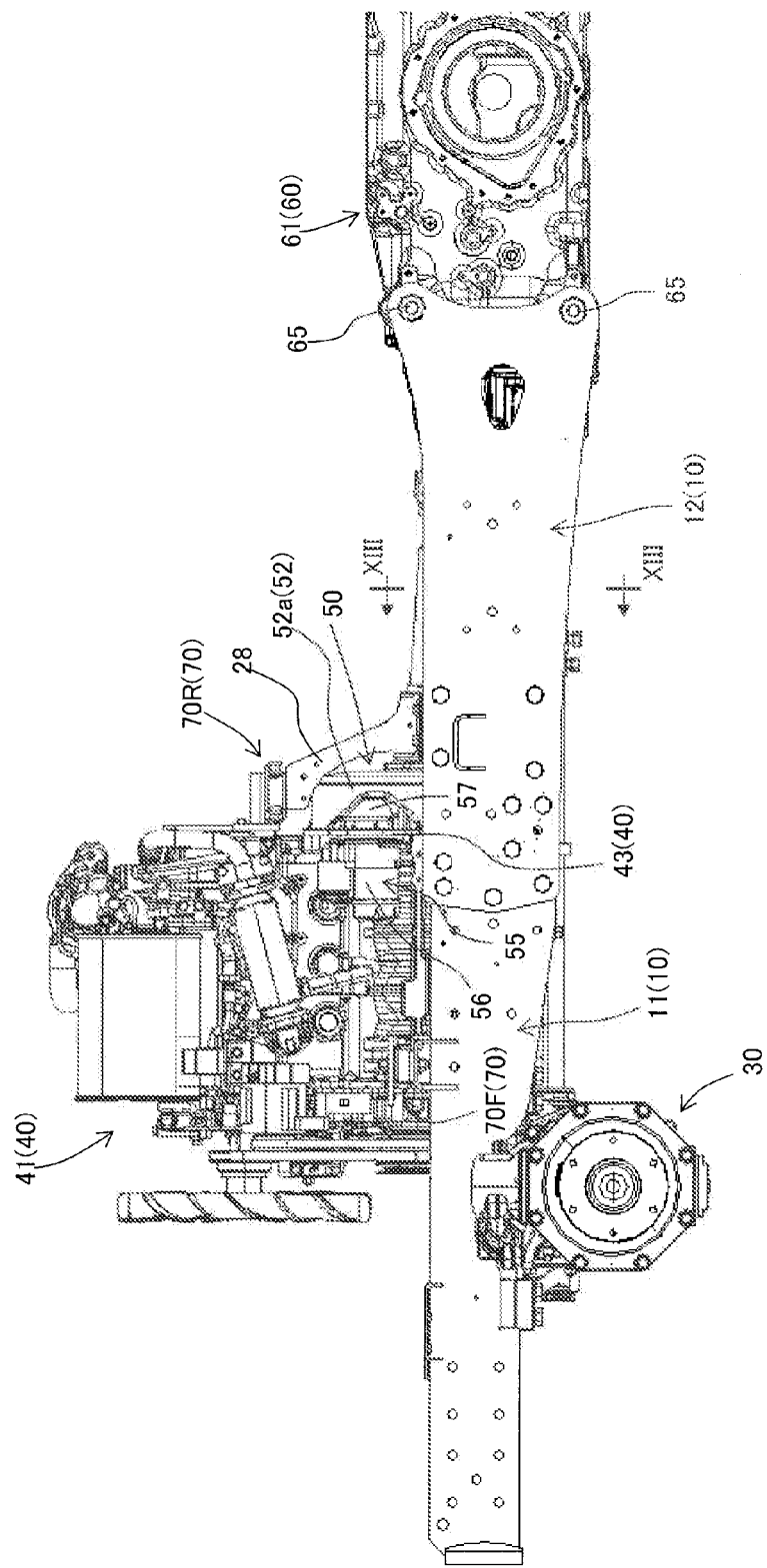
[FIG. 3]

FIG. 2 is a perspective view, seen from front, of a body of the work vehicle 1, and FIG. 3 is a partial side view thereof.

As shown in FIGS. 1 to 3, the work vehicle 1 includes a pair of right and left vehicle frames 10, a pair of right and left front wheels 21, a pair of right and left rear wheels 22, a front axle unit 30, an engine unit 40, a flywheel unit 50, and a transmission 60. The front wheels 21 and the rear wheels 22 are located in the front and rear sections of the vehicle, respectively. The front axle unit 30 is supported by the pair of vehicle frames 10. The engine unit 40 is also supported by the pair of vehicle frames 10. The flywheel unit 50 is connected to a rear end surface of the engine unit 40. The transmission 60 operatively receives rotational power from the engine unit 40 by way of the flywheel unit 50.

As shown in FIGS. 2 and 3, the pair of vehicle frames 10 extend in the vehicle longitudinal direction such that plate surfaces thereof are substantially aligned in the vertical direction and face each other.

More specifically, the pair of vehicle frames 10 include a pair of right and left front frames 11 and a pair of right and left main frames 12. The pair of front frames 11 are located in the front section of the vehicle so as to support the front axle unit 30, and extend substantially linearly in a planar view. The pair of main frames 12 are located outward of the pair of front frames 11 in the vehicle width direction, and extend backward and substantially linearly in a planar view such that front ends of the main frames 12 are overlapped with the corresponding front frames 11 in a side view.

In the present embodiment, the work vehicle 1 further includes reinforcing members that reinforce the pair of vehicle frames 10.

Figure 4:
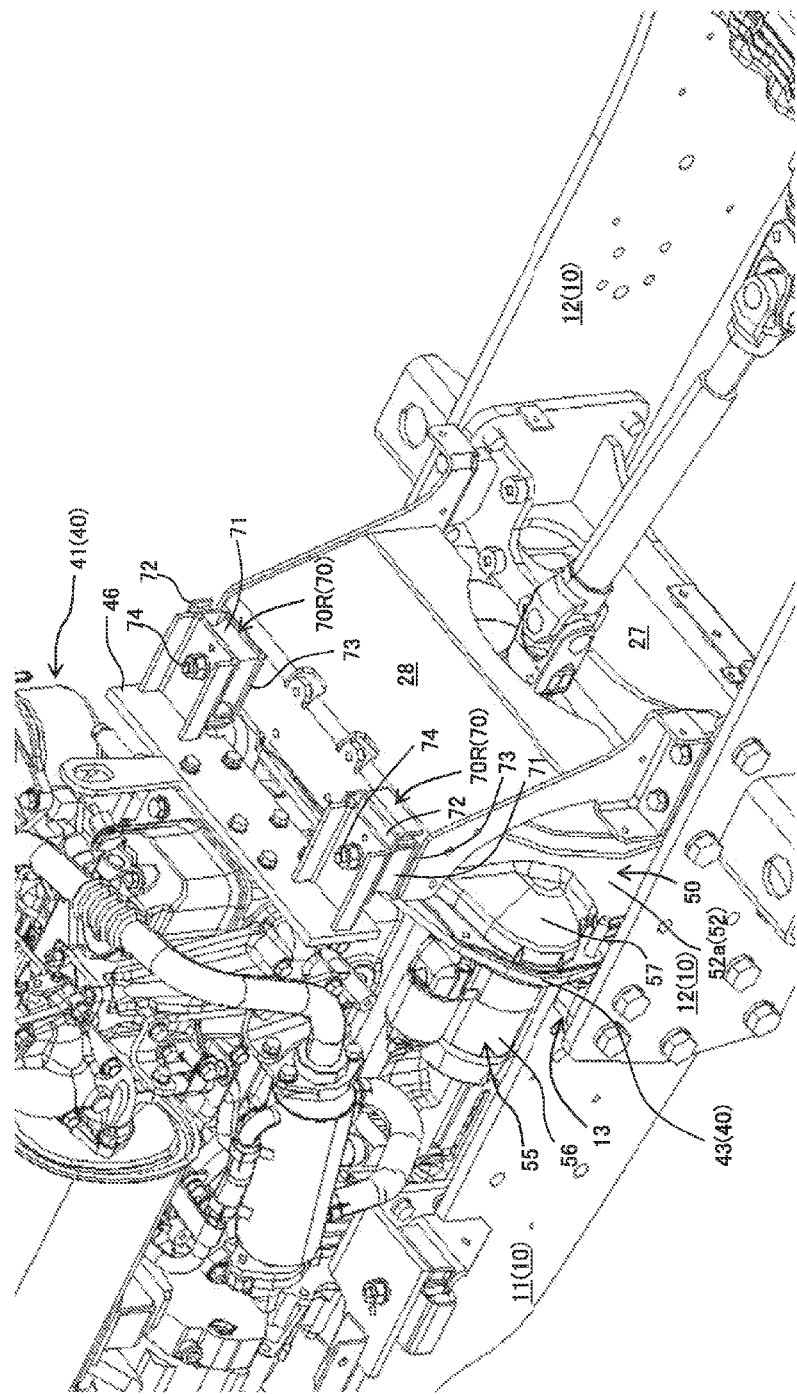
[FIG. 4]

FIG. 4 is a perspective view, seen from above and behind, of the engine unit 40 and the vicinity thereof.

As shown in FIGS. 2 to 4, the reinforcing members include a first reinforcing member 25, a second reinforcing member 26, and a third reinforcing member 27. The first reinforcing member 25 connects the front ends of the pair of front frames 11 with each other. The second reinforcing member 26 connects the pair of front frames 11 at portions where the front axle unit 30 is supported. The third reinforcing member 27 connects the pair of main frames 12 with each other at positions behind the flywheel unit 50.

The front axle unit 30 is supported by the pair of front frames 11 so as to be located below the pair of vehicle frames 10 and be along the vehicle width direction in a state where two ends thereof are positioned outward of the pair of vehicle frames 10 in the vehicle width direction.

Figure 5:
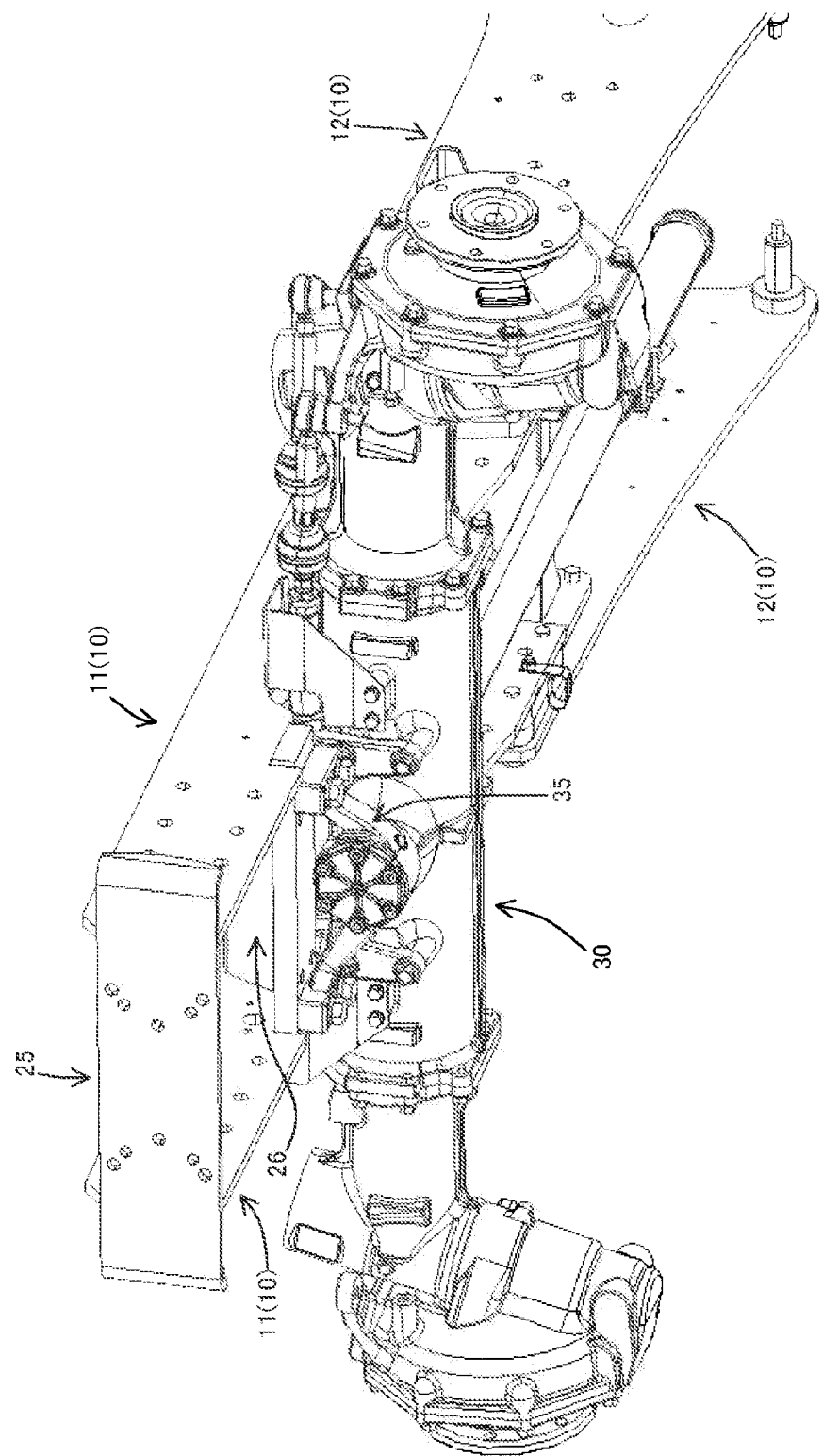
[FIG. 5]
Figure 6:
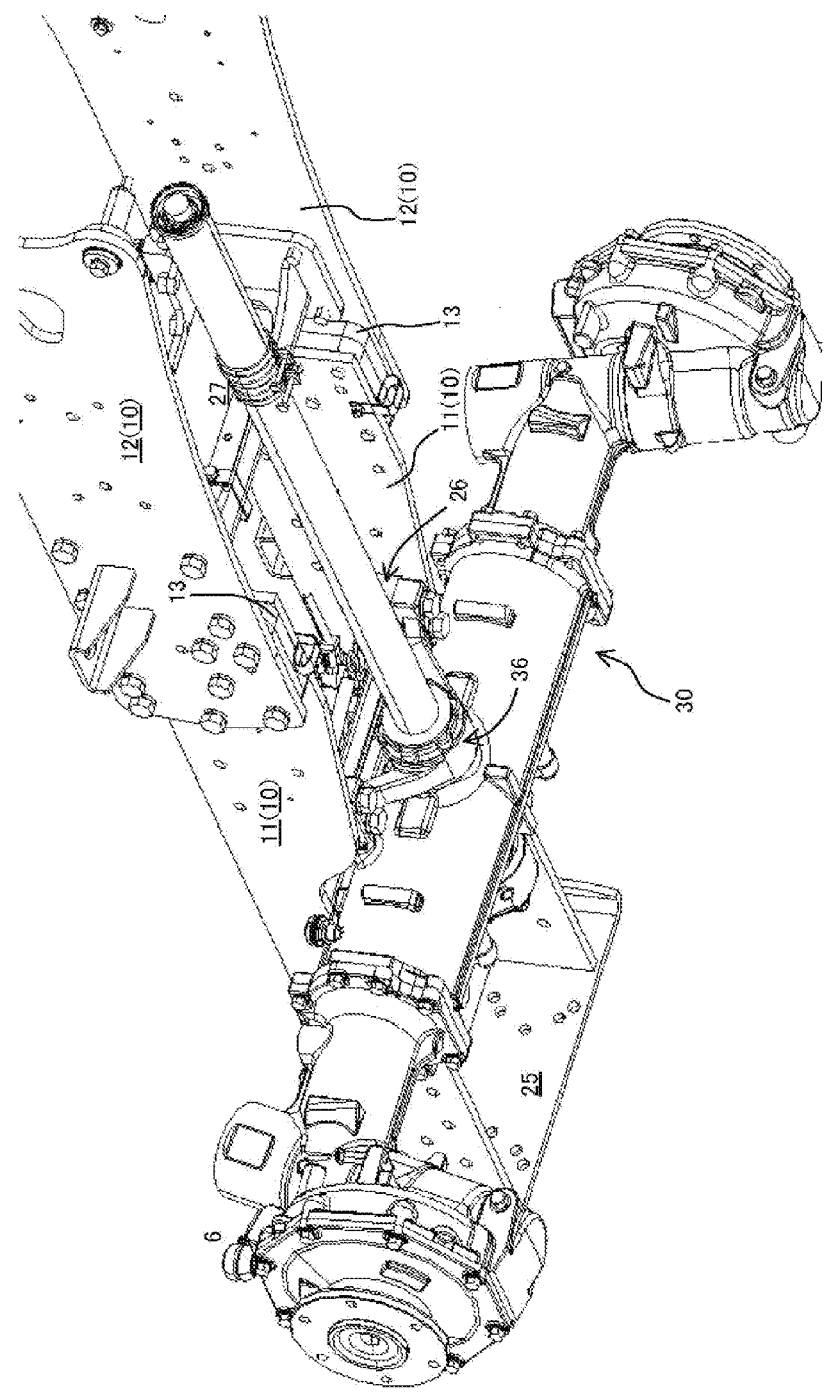
[FIG. 6]

FIG. 5 is a perspective view, seen from below and front, of the front axle unit 30, and FIG. 6 is a perspective view thereof seen from below and behind. It is noted that FIGS. 5 and 6 do not illustrate the engine unit 40, the flywheel unit 50, and the transmission 60, for the purpose of easier understanding.

As shown in FIGS. 5 and 6, the front axle unit 30 is supported by a front support frame 35 and a rear support frame 36, which are connected directly or indirectly with the pair of front frames 11, so as to be swingable about a rotary shaft provided in the vehicle longitudinal direction.

In the present embodiment, the front support frame 35 and the rear support frame 36 are attached to the second reinforcing member 26.

The pair of front wheels 21 are connected to the two ends of the front axle unit 30 in a steerable manner, respectively.

The pair of rear wheels 22 are connected to outer ends in the vehicle width direction of a pair of right and left rear axle units (not shown), which are connected to respective side walls of a transmission case 61 of the transmission 60.

Figure 7:
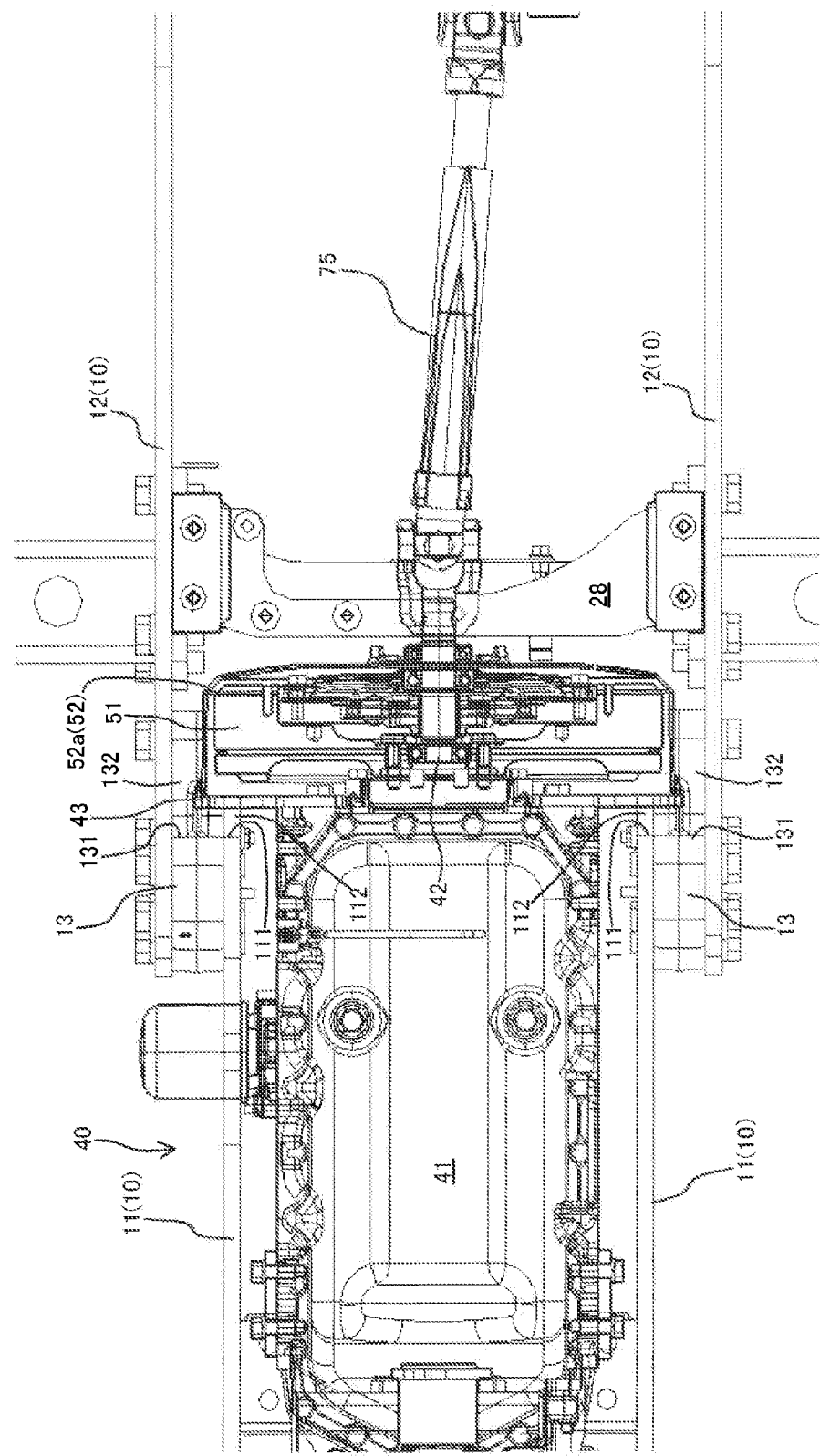
[FIG. 7]

FIG. 7 is a horizontally cross sectional plan view of the engine unit 40 and the vicinity thereof.

As shown in FIGS. 2 to 4 and 7, the engine unit 40 includes an engine main body 41, an output shaft 42 that extends backward from the engine main body 41, and a mount flange 43 that extends radially outward from a rear end of the engine main body 41.

In the present embodiment, the engine unit 40 is supported by the vehicle frames 10 with antivibration support mechanisms 70 being interposed therebetween at four points of front, rear, right, and left positions.

More specifically, as shown in FIGS. 2 to 4, the antivibration support mechanisms 70 include a pair of right and left front antivibration support mechanisms 70F and a pair of right and left rear antivibration support mechanisms 70R.

The engine unit 40 is supported at the front positions by the pair of front frames 11 with the pair of front antivibration support mechanisms 70F being interposed therebetween, and is also supported at the rear positions indirectly by the pair of main frames 12 with the pair of rear antivibration support mechanisms 70R being interposed therebetween.

Figure 8:
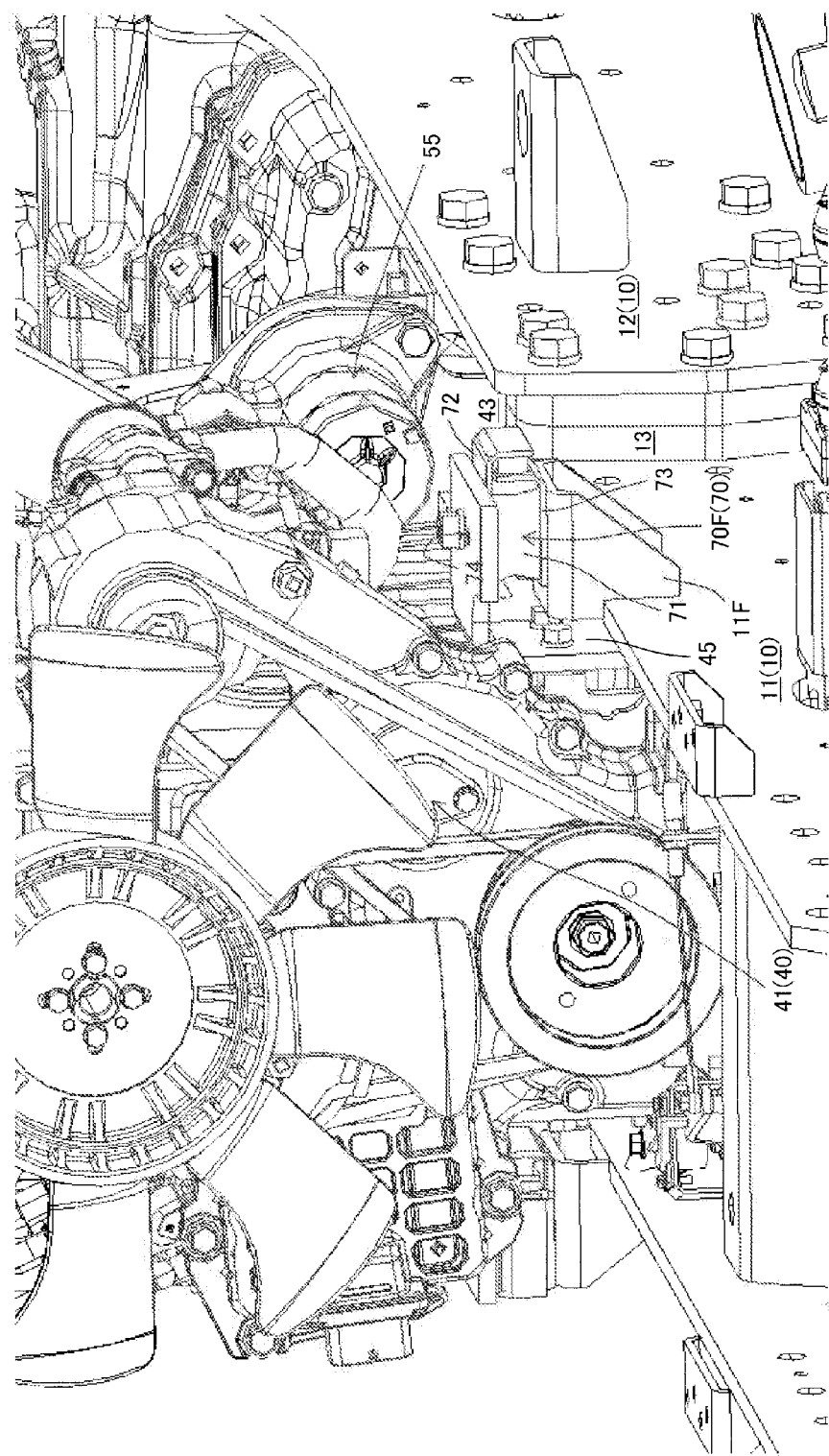
[FIG. 8]

FIG. 8 is a perspective view of the front antivibration support mechanism 70F located on the left side, and the vicinity thereof.

As shown in FIGS. 4 and 8, the front and rear antivibration support mechanisms 70F and 70R each have an elastic member 71, a first base member 72, a second base member 73, a first bolt shaft 74, and a second bolt shaft (not shown). The elastic member 71 has an upper surface and a lower surface. The first base member 72 has a lower surface being fixed to the upper surface of the elastic member 71. The second base member 73 has an upper surface being fixed to the lower surface of the elastic member 71. The first bolt shaft 74 is fixed to an upper surface of the first base member 72. The second bolt shaft is fixed to a lower surface of the second base member 73.

As shown in FIG. 8, each of the front antivibration support mechanisms 70F is interposed between an engine front-side attachment stay 45 and a front frame front-side attachment stay 11F. The engine front-side attachment stay 45 is provided on a corresponding side surface of the engine unit 40. The front frame front-side attachment stay 11F is provided on a corresponding one of the front frames 11.

More specifically, the first bolt shaft 74 is inserted through an attachment hole that is provided in the engine front-side attachment stay 45, and the second bolt shaft is inserted through an attachment hole that is provided in the front frame front-side attachment stay. In this state, nuts are fastened around the first and second bolt shafts, respectively.

As shown in FIG. 4, the rear antivibration support mechanisms 70R are each interposed between an engine rear-side attachment stay 46 provided on the rear end surface of the engine unit 40 and an engine mount bracket 28.

In the present embodiment, the engine mount bracket 28 stands on the third reinforcing member 27 that connects the pair of main frames 12 with each other.

As shown in FIGS. 3, 4, and 7, the flywheel unit 50 includes a flywheel main body 51 and a flywheel cover 52. The flywheel main body 51 is connected coaxially with the output shaft 42 of the engine unit 40. The flywheel cover 52 is connected to the mount flange 43 so as to surround the flywheel main body 51.

The work vehicle 1 further includes a starter unit 55 for starting the engine unit 40.

As shown in FIGS. 3, 4, and 8, the starter unit 55 includes a starter main body 56 and a gear train (not shown) which operatively connects a starter drive shaft (not shown) of the starter main body 56 to the flywheel main body 51.

The gear train is accommodated in a gear cover 57 that is provided integrally with the flywheel cover 52.

More specifically, the flywheel cover 52 integrally includes a flywheel cover main body 52a and the gear cover 57. The flywheel cover main body 52a surrounds the flywheel main body 51. The gear cover 57 bulges radially outward from the flywheel cover main body 52a to accommodate the gear train.

Figure 9:
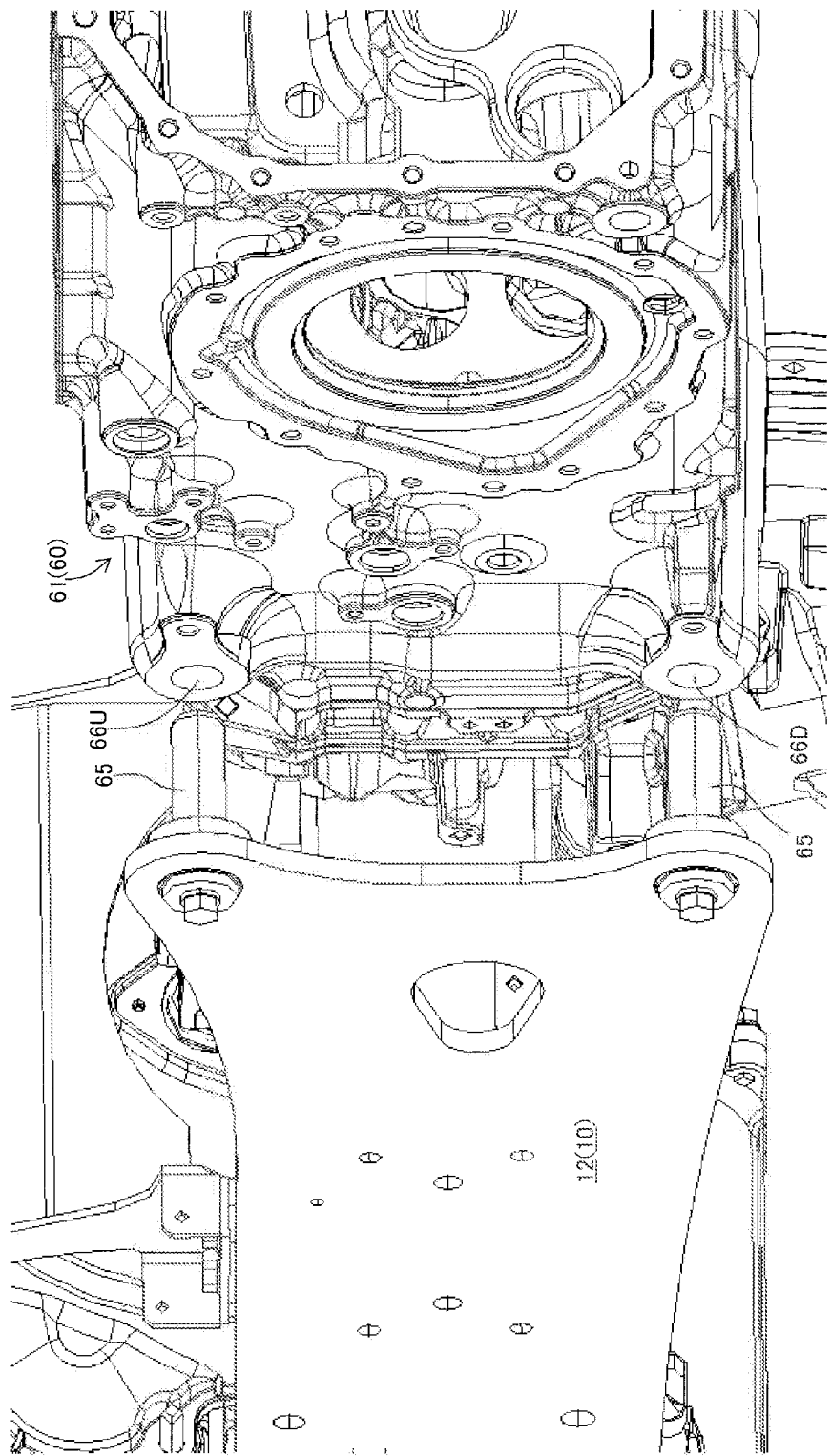
[FIG. 9]

FIG. 9 is a partially exploded perspective view of the transmission case 61 and the vicinity thereof.

As shown in FIGS. 1, 2, and 9, the transmission 60 is connected to the rear ends of the pair of main frames 12 while being disposed behind and spaced apart from the flywheel unit 50.

In the present embodiment, the rear ends of the pair of main frames 12 are connected to the side walls of the transmission case 61 of the transmission 60 by means of pins 65, respectively.

As shown in FIG. 9, the transmission case 61 is provided in each of the right and left side surfaces with two attachment holes, namely, an upper attachment hole 66U and a lower attachment hole 66D. Further, the rear end of each of the pair of main frames 12 is connected to the two attachment holes 66U and 66D by means of the pins 65, respectively. The configuration described above achieves efficient connecting work between to pair of main frames 12 and the transmission case 61.

Figure 10:
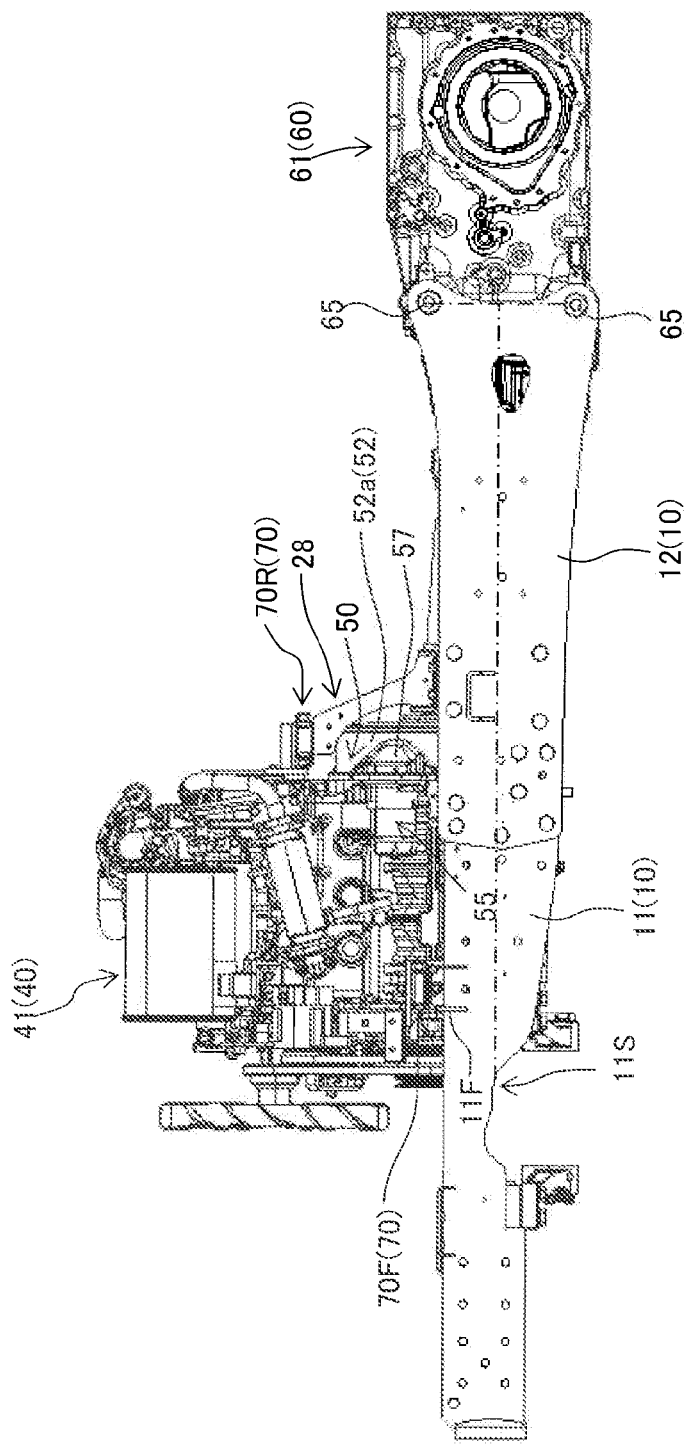
[FIG. 10]

FIG. 10 is a side view of the pair of vehicle frames 10 with the front axle unit 30 being removed.

As shown in FIGS. 2 and 10, the pair of front frames 11 have stopper portions 11S that define the swinging limits of the front axle unit 30.

More specifically, as described earlier, the front axle unit 30 is supported directly or indirectly by the pair of front frames 11 in a swingable manner about the rotary shaft along the vehicle longitudinal direction, while being disposed below the pair of front frames 11, and having the two ends that are positioned outward of the pair of front frames 11 in the vehicle width direction.

Each of the pair of front frames 11 is provided with a cutout that is opened downward at a position in correspondence with the position of the front axle unit 30. The cutout serves as the stopper portion 11S that defines the swinging limit of the front axle unit 30 about the rotary shaft.

As shown in FIG. 10, it is preferable to substantially level the vertical position of the stopper portion 11S and a vertically middle position between the upper attachment hole 66U and the lower attachment hole 66D.

The configuration described above improves the strength of the vehicle frames 10 against twisting loads to be applied to the vehicle frames 10 in a case where the front axle unit 30 swings about the rotary shaft and comes into contact with the stopper portions 11S.

In the present embodiment, as shown in FIGS. 2, 4, 7 and 8, the pair of main frames 12 are disposed outward of the pair of front frames 11 in the vehicle width direction, and the front ends of the pair of main frames 12 are connected to the rear ends of the pair of front frames 11 with spacers 13 being interposed therebetween, respectively.

Figure 11:
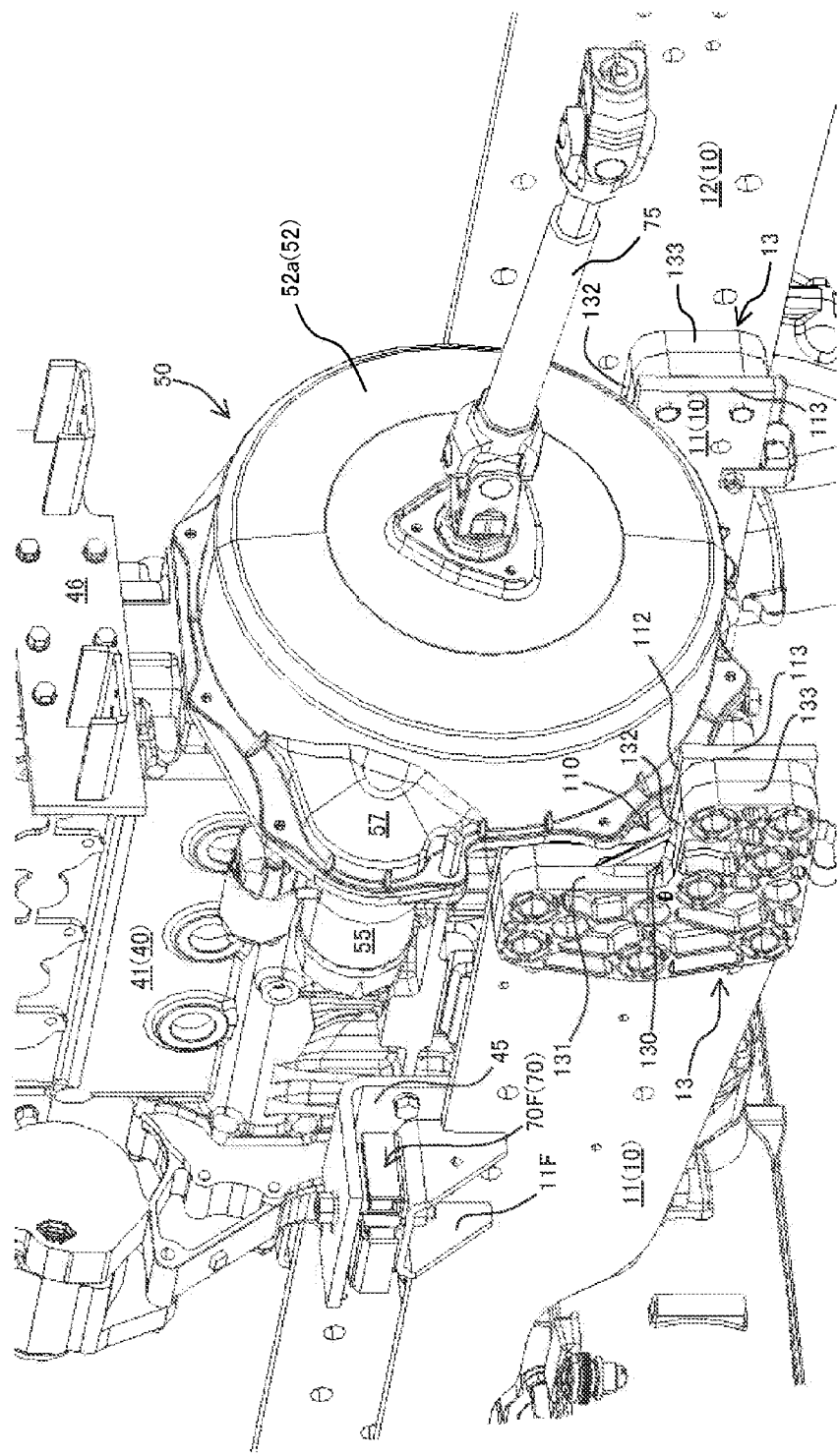
[FIG. 11]

FIG. 11 is a perspective view, seen from behind, of connection sites between the front frames 11 and the main frames 12, with the left main frame 12 being removed.

Figure 12:
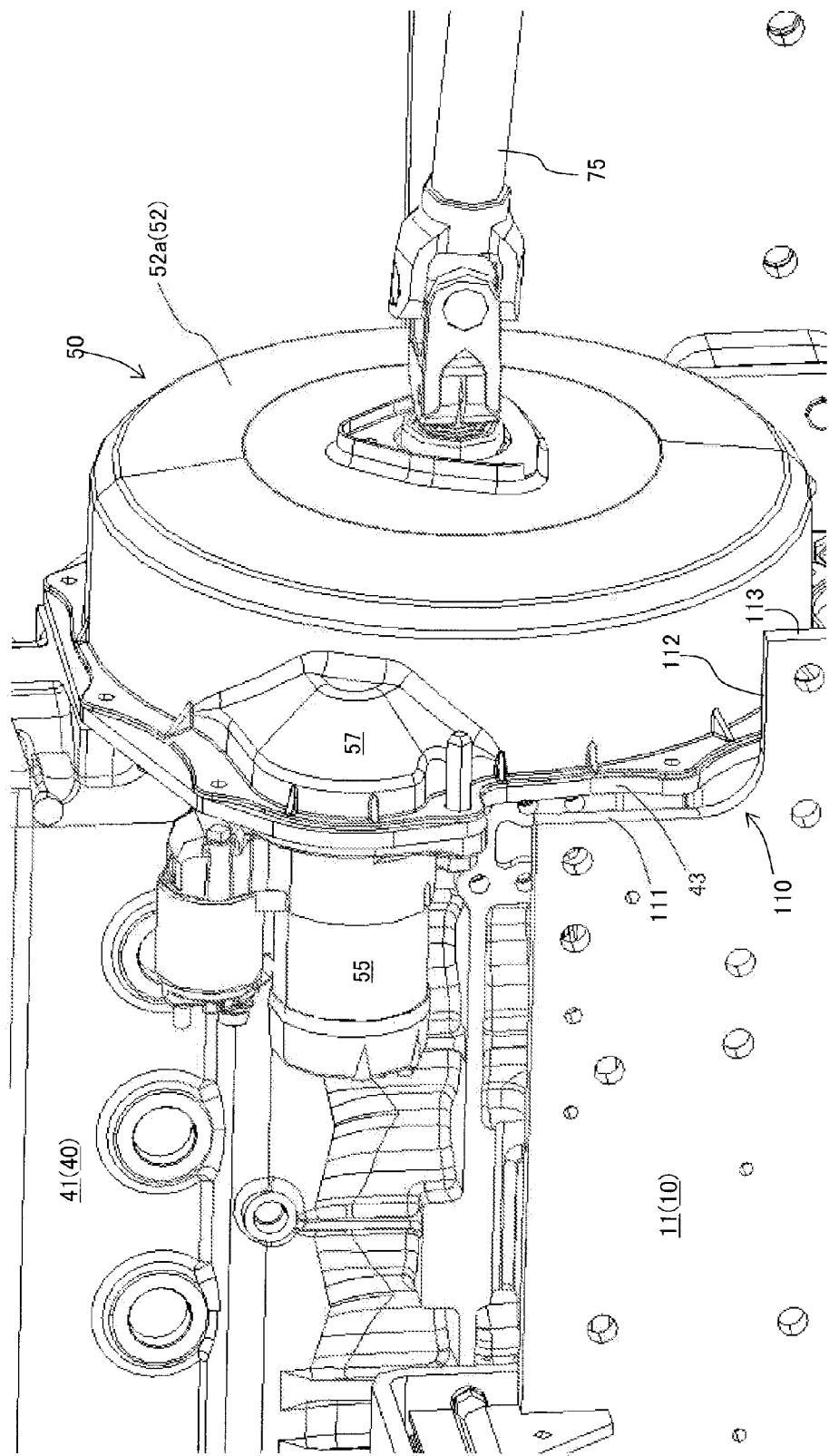
[FIG. 12]

FIG. 12 is a perspective view, seen from a side, of the connection sites and the vicinity thereof, with the left spacer 13 and the left main frame 12 being removed.

Figure 13:
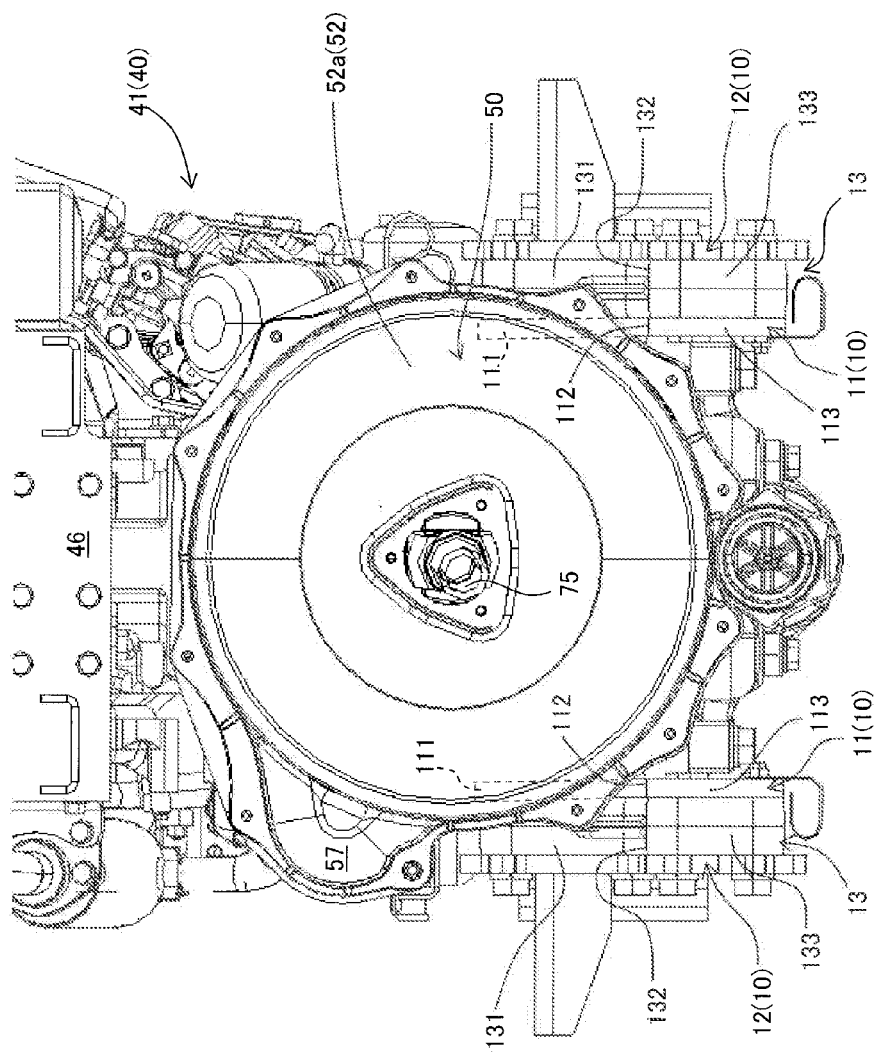
[FIG. 13]

FIG. 13 is a cross sectional view taken along line XIII-XIII indicated in FIG. 3.

It is noted that, in FIGS. 11 to 13, the third reinforcing member 27 and the engine mount bracket 28 are not illustrated for the purpose of easier understanding.

As described earlier, in the present embodiment, the outer surface of the rear end of each of the pair of front frames 11 is connected to the inner surface of the front end of corresponding one of the main frames 12 with the spacer 13 being interposed therebetween.

This configuration enables the spacing width in the vehicle width direction between the pair of front frames 11, which support the front axle unit 30, to be reduced as much as possible independently of the spacing width in the vehicle width direction between the pair of main frames 12, thereby increasing as much as possible the maximum steerable angles of the pair of front wheels 21, which are supported by the front axle unit 30 in a steerable manner, with no increase of the mounting pitch by which the front wheels 21 are separated from each other in the vehicle width direction.

More specifically, the front wheels 21 are provided at the respective ends of the front axle unit 30 that is supported by the pair of front frames 11, and are rotatable within the ranges of not interfering with the pair of front frames 11, respectively. Accordingly, in order to increase the maximum steerable angles of the front wheels 21, there needs the reduction of the spacing width in the vehicle width direction between the pair of front frames 11 or the increase of the mounting pitch (the spacing width in the vehicle width direction) by which the pair of front wheels 21 are separated from each other in the vehicle width direction.

However, a conventional work vehicle configured so that the rear ends of the front frames are connected directly to the front ends of the main frames cannot achieve the reduction of the spacing width in the vehicle width direction between the pair of front frames.

More specifically, the spacing width in the vehicle width direction between the pair of main frames 12 is defined dependently on the width of the flywheel unit 50 as well as on the width of the transmission case 61. Therefore, in such a case as in the conventional art where the pair of front frames 11 and the pair of main frames 12 are connected directly with each other, the spacing width in the vehicle width direction between the pair of front frames 11 is also defined dependently on the width of the flywheel unit 50 as well as on the width of the transmission case 61. As a result, it is impossible to freely reduce the spacing width in the vehicle width direction between the pair of front frames 11.

Further, the mounting pitch (the spacing width in the vehicle width direction) by which the pair of front wheels 21 are separated from each other in the vehicle width direction is defined in accordance with the specifications of the work vehicle 1, and it is thus preferable to reduce the spacing width as much as possible, in view of the reduction in size of the work vehicle 1. Therefore, it is not desired to increase the mounting pitch by which the pair of front wheels 21 are separated from each other in the vehicle width direction in order to prevent the front wheels 21 from interfering with the front frames 11 during the vehicle is turned.

In contrast, in the work vehicle 1 according to the present embodiment, as described earlier, the outer surface of the rear end of each of the pair of front frames 11 is connected to the inner surface of the front end of corresponding one of the main frames 12 with the spacer 13 being interposed therebetween.

This configuration enables the spacing width between the pair of front frames 11 to be reduced as much as possible independently of the spacing width between the pair of main frames 12 by changing the thickness of the spacers 13. As a result, the maximum steerable angles of the pair of front wheels 21, which are supported by the front axle unit 30 in a steerable manner, can be increased as much as possible without causing the increase of the mounting pitch by which the front wheels 21 are separated from each other in the vehicle width direction.

Moreover, in the present embodiment, the following arrangements are made in order to dispose the engine unit 40 and the flywheel unit 50 as low as possible without increasing the spacing width between the pair of front frames 11.

Specifically, as shown in FIGS. 11 and 12, the pair of front frames 11 are arranged such that at least upper regions 111 in rear end surfaces 110 are located forward of the mount flange 43.

As shown in FIGS. 11 and 12, in the present embodiment, the rear end surfaces 110 of the pair of front frames 11 each include, in addition to the upper region 111, a backward extending region 112 and a lower region 113. The backward extending region 112 extends backward from the lower end of the upper region 111. The lower region 113 extends downward from the rear end of the backward extending region 112.

As shown in FIGS. 11 and 12, the spacer 13 has a rear end surface 130 that has a shape identical with that of the rear end surface 110 of the corresponding front frame 11.

More specifically, the rear end surface 130 of the spacer 13 has an upper region 131, a backward extending region 132, and a lower region 133. The upper region 131 is located forward of the mount flange 43. The backward extending region 132 extends backward from the lower end of the upper region 131. The lower region 133 extends downward from the rear end of the backward extending region.

The spacer 13 is interposed between the outer surface of the rear end of the front frame 11 and the inner surface of the front end of the main frame 12 in a state where the rear end surface 130 of the spacer 13 and the rear end surface 110 of the corresponding front frame 11 configure an identical plane.

As shown in FIGS. 10 to 13, the engine unit 40 and the flywheel unit 50 are supported by the pair of vehicle frames 10 such that at least lower portions thereof are overlapped with the pair of vehicle frames 10 in a side view and the mount flange 43 is overlapped with the upper regions 111 in the rear end surfaces 110 of the front frames 11 in a front view.

The work vehicle 1 configured as described above exerts the following effects.

Specifically, it is preferable that the transmission 60 is disposed as low as possible in view of lowering the position of the driver's seat to be installed above the transmission 60 as well as lowering the center of gravity of the work vehicle 1.

In such a case where the transmission 60 is disposed at a low position, the flywheel unit 50 is also desired to be disposed at a low position, which is operatively connected to the transmission 60 by way of a transmission shaft 75. If the flywheel unit 50 is disposed at a low position together with the transmission 60, the transmission shaft 75 can be provided as horizontally as possible. This achieves the increase in transmission efficiency of the transmission shaft 75 as well as the reduction in noise, and enables a floor member disposed above the transmission shaft 75 to be fully flattened. The center of gravity of the work vehicle 1 can be further lowered by the disposition of the engine unit 40 and the flywheel unit 50 at low positions.

In this regard, in the work vehicle 1 according to the present embodiment, each of the front frames 11 is disposed such that at least the upper region 111 in the rear end surface 110 is located forward of the mount flange 43, in a state where the outer surface is connected to the inner surface of the corresponding main frame 12 with the spacer 13 being interposed therebetween. Further, the engine unit 40 and the flywheel unit 50 are supported by the pair of vehicle frames 10 in a state where at least the lower portions are overlapped with the pair of vehicle frames 10 in a side view and the mount flange 43 is overlapped with the upper regions 111 in the rear end surfaces 110 of the front frames 11 in a front view.

The configuration described above makes it possible to define the spacing width in the vehicle width direction between the pair of main frames 12 in correspondence with the width of the flywheel unit 50 and the width of the transmission case 61, and also locate the engine unit 40 and the flywheel unit 50 as low as possible with no increase of the spacing width between the front frames 11 and no interference with the vehicle frames 10 by the engine unit 40 and the flywheel unit 50.

In such a case as in the present embodiment where the engine unit 40 is supported by the vehicle frames 10 with the antivibration support mechanisms 70 being interposed therebetween, the distance in the vehicle longitudinal direction between each of the upper regions 111 and the mount flange 43 can be preferably defined such that the mount flange 43 is brought into contact with the upper regions 111 in the rear end surfaces 110 of the pair of front frames 11 when the engine unit 40 is shifted forward by a predetermined distance relatively to the vehicle frames 10.

The configuration detailed above can realize a safety mechanism that is simply structured and limits an amount of a relative forward shift of the engine unit 40 with respect to the vehicle frames 10.

More specifically, in the case where the engine unit 40 is supported in a vibration-isolated manner by the vehicle frames 10 with the antivibration support mechanisms 70 being interposed therebetween, the engine unit 40 is shifted forward relatively to the vehicle frames 10 when a brake is operated while the vehicle 1 is traveling forward or when the stopped vehicle 1 is started to travel backward.

In the case where the engine unit 40 is shifted relatively to the vehicle frames 10, excessive loads are applied to the antivibration support mechanisms 70, which may be damaged in some cases.

In this regard, the configuration described above enables the amount of relative shift of the engine unit 40 to be limited by a simple structure utilizing the mount flange 43 and the front frames 11.

As described above, in the present embodiment, the rear end surface 110 of each of the pair of front frames 11 has the backward extending region 112 that extends backward from the lower end of the upper region 111.

As shown in FIGS. 11 and 12, in the configuration described above, the backward extending region 112 preferably extends in the vehicle longitudinal direction across the mount flange 43 such that the mount flange 43 is overlapped with the backward extending region 112 in a planar view seen from above.

In this configuration, the backward extending regions 112 can inhibit the engine unit 40 from shifting downward relatively to the vehicle frames 10 by an amount exceeding a predetermined amount, which effectively prevents damages to the antivibration support mechanisms 70.

DESCRIPTION OF THE REFERENCE NUMERALS

1 work vehicle
10 vehicle frame
11 front frame
110 rear end surface
111 upper region
12 main frame
13 spacer
21 front wheel
30 front axle unit
40 engine unit
41 engine main body
42 output shaft
43 mount flange
50 flywheel unit
51 flywheel main body
52 flywheel cover
60 transmission
70 antivibration support mechanism

The invention claimed is:

1. A work vehicle comprising:
    a pair of right and left vehicle frames that extend in a vehicle longitudinal direction, the pair of right and left vehicle frames each including a plate surface that extends substantially vertically, plate surfaces of the pair of right and left vehicle frames facing each other,
    a front axle unit that is supported by the pair of vehicle frames so as to be located below the pair of vehicle frames and be along a vehicle width direction in a state where two ends thereof are positioned outward of the pair of vehicle frames in the vehicle width direction,
    a pair of right and left front wheels that are supported by both ends of the front axle unit in a steerable manner,
    an engine unit that is supported by the pair of vehicle frames,
    a flywheel unit that is connected to a rear end surface of the engine unit, and a transmission that is disposed backward at a distance from the flywheel unit and operatively receives rotational power from the engine unit through the flywheel unit,
    the pair of vehicle frames including a pair of right and left front frames that support the front axle unit, and a pair of right and left main frames that have rear ends directly or indirectly connected to side surfaces of a transmission case of the transmission respectively,
    wherein an outer surface of a rear end of each of the pair of front frames is connected to an inner surface of a front end of the corresponding one of the main frames with a spacer being interposed therebetween,
    wherein the engine unit includes an engine main body, an output shaft that extends backward from the engine main body, and a mount flange that extends radially outward, from a rear end of the engine main body,
    wherein the flywheel unit includes a flywheel main body that is connected with the output shaft, and a flywheel cover that is connected to the mount flange so as to surround the flywheel main body,
    wherein the pair of front frames are arranged such that at least upper regions in rear end surfaces thereof are located forward of the mount flange, and
    wherein the engine unit and the flywheel unit are supported by the pair of vehicle frames such that at least lower portions thereof are overlapped with the pair of vehicle frames in a side view and the mount flange is overlapped with the upper regions of the rear end surfaces of the front frames in a front view.

2. A work vehicle with cabin according to claim 1,
    wherein the engine unit is supported by the vehicle frames with antivibration support mechanisms being interposed therebetween, and
    wherein a distance in the vehicle longitudinal direction between each of the upper regions and the mount flang is defined such that the mount flange is brought into contact with the upper regions of the rear end surfaces of the pair of front frames when the engine unit is shifted forward by a predetermined distance relative to the vehicle frames.

3. A work vehicle with cabin according to claim 2,
    wherein the rear end surface of each of the pair of front frames has a backward extending region that extends backward from a lower end of the upper region, and
    wherein the mount flange is overlapped with the backward extending region in a planar view seen from above.

* * * * *